US005756761A

United States Patent [19]

Dueppen et al.

[11] Patent Number: 5,756,761
[45] Date of Patent: May 26, 1998

[54] PROCESS FOR DRYING HYDROPHOBIC AMINO ACIDS WITH IMPROVED PROCESS FOR INCREASED BULK DENSITY

[75] Inventors: Daniel Dueppen; Thomas Binder; Mark Matlock, all of Decatur, Ill.

[73] Assignee: Archer Daniels Midland Company, Decatur, Ill.

[21] Appl. No.: 461,323

[22] Filed: Jun. 5, 1995

Related U.S. Application Data

[63] Continuation-in-part of Ser. No. 377,760, Jan. 24, 1995, abandoned.

[51] Int. Cl.$^6$ .................................................. C07D 209/08
[52] U.S. Cl. ........................... 548/497; 562/559; 562/562; 562/564
[58] Field of Search ........................... 548/497; 562/564, 562/559, 562

[56] References Cited

U.S. PATENT DOCUMENTS

| 4,734,401 | 3/1988 | Blouin ........................... 514/14 |
|---|---|---|
| 4,837,371 | 6/1989 | Ogawa et al. ........................... 548/497 |
| 4,886,659 | 12/1989 | Baines et al. ........................... 424/63 |
| 5,057,615 | 10/1991 | Kono ........................... 548/497 |

*Primary Examiner*—Joseph McKane
*Attorney, Agent, or Firm*—Laff, Whitesel, Conte & Saret, Ltd.

[57] ABSTRACT

A process for improving the solubility of hydrophobic amino acids in which hot saturated aqueous solutions of at least two different amino acids are first combined. A first step includes making a hot saturated aqueous solution of a first and hydrophobic amino acid having a low solubility in water. A second step includes making a hot saturated aqueous solution of a second and hydrophilic amino acid having a high solubility in water. Then the two hot saturated aqueous solutions are mixed to prepare a combined hot solution mixture, and dried. The resulting product is an amino acid food supplement which is blended into animal feed. The preferred amino acids are tryptophan and lysine, when the animal is a domestic farm animal. A preferred ratio is where the concentration of tryptophan is greater than 50 grams per liter and the concentration of lysine is greater than 300 grams per liter.

21 Claims, 4 Drawing Sheets

TABLE 1

| Flask | Lysine (grams) | Tryptophan (grams) | Temp. (°F) | Comments (all samples in 50 ml water) | Lys/Tryp Ratio | Dry Solids (g/l) |
|---|---|---|---|---|---|---|
| A | 70 | 5 | 230 | in solution | 14 | 600 |
| B | 60 | 5 | 226 | in solution | 12 | 565 |
| C | 50 | 5 | 233 | in solution | 10 | 524 |
| D | 40 | 5 | 223 | in solution | 8 | 474 |
| A | 70 | 6 | 238 | in solution | 11.7 | 603 |
| B | 60 | 6 | 236 | in solution | 10 | 569 |
| C | 50 | 6 | 242 | almost in solution | 8.3 | 528 |
| D | 40 | 6 | 240 | not in solution | 6.7 | 479 |
| A | 70 | 6.5 | 245 | in solution | 10.8 | 605 |
| B | 60 | 6.5 | 242 | almost in solution | 9.2 | 571 |
| C | 50 | 6.5 | 243 | not in solution | 7.7 | 531 |
| A | 70 | 7 | 243 | almost in solution | 10 | 606 |
| B | 60 | 7 | 242 | not in solution | 8.6 | 573 |

FIG. 2

TABLE 2

| Sample | %TS | Mixture Dried | g/l Lys. | g/l Iso. | g/l Trp. | lbs/ft3 BD |
|---|---|---|---|---|---|---|
| Tryptophan "TRP" | 2.4 | 50g trp + 2kg water | 0 | 0 | 24.4 | 9.06 |
| L-Isoleucine "ISO" | 2.4 | 50g iso + 2kg water | 0 | 24.4 | 0 | 3.13 |
| Lysine "LYS" | 16.7 | 100g lys + 500g water | 166.7 | 0 | 0 | 21.9 |
| Lysine | 50 | 500g lys + 500g water | 500 | 0 | 0 | 26.35 |
| Lysine-91% Tryptophan-9% | 52.4 | 700g lys + 70g trp + 700g H₂O | 476 | 0 | 47.6 | 23.12 |
| Lysine-92% Tryptophan-8% | 56.5 | 840g lys + 70g trp + 700g H₂O | 522 | 0 | 43.5 | 26.10 |
| Lysine-93% Tryptophan-7% | 60 | 980g lys + 70g trp + 700g H₂O | 560 | 0 | 40 | 18.4 |
| Lysine-90% L-Isoleu.-10% | 20 | 450g lys + 50g iso + 2kg H₂O | 180 | 20 | 0 | 36.78 |
| Lysine-90% L-Isoleu.-5% Tryptophan-5% | 33.3 | 450g lys + 25g iso + 25g trp + 1kg H₂O | 300 | 16.7 | 16.7 | 26.83 |

Where: "TS" is the total solids
"G/L" is grams/liter
"BD" is bulk density in pounds/cubic foot

FIG. 3

TABLE 3

Tryptophan/Lysine Plant Runs on the Spray Granulator

| Date | % TS | g/l trp | g/l Lys | % Trp | % Lys | Ratio Lys/Tr | lb/ft³ BD |
|---|---|---|---|---|---|---|---|
| 2/3 | 37.7 | 37.7 | 221.5 | 10 | 58.8 | 5.9 | 39.7 |
| 2/4 | 38.5 | 38.7 | 178.4 | 10.1 | 46.3 | 4.6 | 41.8 |
| 2/5 | 36.6 | 37.1 | 183.1 | 10.1 | 50.0 | 5.0 | 38.9 |
| 2/20 | 37.9 | 57.8 | 293.4 | 15.3 | 77.4 | 5.1 | 37.5 |
| 2/22 | 35.2 | 54.2 | 289.0 | 15.4 | 82.1 | 5.3 | 37.7 |
| 2/28 | 30.8 | 65.2 | 236.2 | 21.2 | 76.7 | 3.6 | 36.5 |
| 3/2 | 35.5 | 71.8 | 274.8 | 20.2 | 77.4 | 3.8 | 36.1 |
| 3/8 | 39.6 | 61.7 | 326.5 | 15.6 | 82.4 | 5.3 | 35.2 |
| 3/17 | 29.0 | 56.6 | 228.8 | 19.5 | 78.9 | 4.0 | 35.5 |
| 2/14 | 32.4 | 65.4 | 259.4 | 20.2 | 80.1 | 4.0 | 34.7 |

FIG. 4

PROCESS FOR DRYING HYDROPHOBIC AMINO ACIDS WITH IMPROVED PROCESS FOR INCREASED BULK DENSITY

This is a continuation-in-part of Ser. No. 08/377,760, filed Jan. 24, 1995 now abandoned.

BACKGROUND

This invention relates to processes for making various amino acids and more particularly to processes for increasing the bulk density of the amino acids and improving the economics of drying and shipping the amino acids.

Various patents provide background information which may help one to familiarize himself with the field of processing and drying amino acids. For example, U.S. Pat. No. 4,837,371 (Ogawa et al.) describes a process which uses an aliphatic alcohol and a reverse osmosis membrane for concentrating an aqueous solution containing an amino acid having a low solubility in water.

U.S. Pat. No. 4,734,401 (Blouin) is for a process which spray dries a solution containing one or more amino acids and optionally other components such as salts, buffers, lipids, vitamins, trace elements, and electrolytes.

U.S. Pat. No. 4,886,659 (Baines et al.) relates to drying an aqueous mixture of Maillard reactants as by spray drying; however, the process is primarily one of producing a distinctive color. The Maillard reactants may include various amino acids, among other things.

U.S. Pat. No. 5,057,615 (Kano et al.) describes a process for purifying tryptophan by use of water containing acetic acid and a process of heating and cooling to obtain a crystallized tryptophan.

Various grains and oil seed meals are used to feed animals, primarily livestock, throughout the world. The proteins in these grains and seed meals include various amino acids in a polymeric form. However, various feeds may be deficient in respect of certain amino acids. This possible deficiency has led to a blending of meals with less expensive grains in order to provide a balanced amino acid profile for feeding the pertinent animal. When the animal receives a balanced amino acid profile in the diet which it consumes, it requires less feed and, in general, is a healthier animal.

Because many of the commonly available blends of feed tend to be somewhat deficient in certain key amino acids, the production of amino acid supplements for enhancing animal feed use has become an important worldwide business. The amino acid supplements can be produced either by fermentation or by chemical means. These pure amino acids are then added at the required levels to provide a balanced protein diet for feeding the animal. Nevertheless, some amino acids are still too expensive or difficult to handle to be widely used at this time.

On the basis of a worldwide market place, it becomes apparent that many factors other than feed values, per se, are also very important. For example, the cost of packaging and shipping becomes a major factor. The prior amino acid production processes often led to products having a very fine particle size and therefore with very low bulk density requiring very large boxes considering the amount of product being shipped. Or, stated another way, the use of overly large boxes of low bulk density product resulted in a costly shipment of a large amount of air. This, in turn, causes very high transportation costs which may be reduced by increasing the bulk density of the product so that the same amount of amino acid product may be shipped in much smaller boxes.

Another problem growing out of the conventional fine particle size of amino acids is an accumulation of dust when handling the product. Such a dust results in health, cleanliness, and other similar problems. Also, the dust could cause an explosive atmosphere. All such problems can be reduced by increasing the bulk density of the amino acids.

Yet another problem encountered during the production of amino acids relates to the solubility of amino acids in water. Some amino acids are hydrophilic while others are hydrophobic. Some of the hydrophobic amino acids have such a low solubility that drying them becomes a severe problem. Thus, when these amino acids of low solubility dry, they become dry particles which are most difficult to rehydrate at the time of use.

A further consideration is the manner of using amino acids. Usually, a tradesman called a "blender" purchases the amino acids and combines them with any grain which is the lowest cost grain on the particular day when the blending occurs. After the amino acids and grains are mixed, they are ground and pelletized into animal feed. The grain may be any one or more in the group of corn, soy, oats, barley, and rye, the most preferred grain being corn or soy, or a mixture thereof. For example, one day, the blender may mix the amino acids with oats, and the next day with corn, etc. Thus, the amino acid should be easily used in connection with any in a wide spectrum of animal feeds.

Usually, the blended animal feed is used to feed monogastric animals. However, if used for non-monogastric animals, such as a cow, for example, the inventive feed supplement is encapsulated so that it will pass unaffected through at least the first stomach of the animal before being exposed to the animal's digestive system. Therefore, the amino acids should be compatible with such encapsulation.

There are many amino acids which fall within the inventive field of interest. To provide a concrete example, the following disclosure will concentrate on L-Tryptophan and L-Lysine hydrochloride; however, it should be understood that this description is not limiting upon the claims. Other amino acids may also be used.

SUMMARY OF THE INVENTION

Accordingly, an object of the invention is to provide new and improved processes for making amino acid feed supplements. More particularly, an object is to improve the physical form of an amino acid by increasing its bulk density and reducing dust causing fines.

Another object is to reduce the cost of manufacturing hydrophobic amino acids by increasing their solubility in water while reducing the amount of water which must be reduced during a drying process.

Still another object of the invention is to reduce the cost of manufacturing and shipping amino acids, and in particular hydrophobic amino acids.

A further object of the invention is to produce L-tryptophan feed supplements in greater quantities, at a lower cost, and with greater bulk density.

In keeping with an aspect of the invention, these and other objects are accomplished by preparing a first hot saturated aqueous solution combining at least two different amino acids. More particularly, a hot polar hydrophilic amino acid is mixed with a hot non-polar hydrophobic amino acid and co-dried to increase the bulk density while decreasing the dust causing fines, and also to reduce the amount of water that has to be extracted from the combined mixture.

BRIEF DESCRIPTION OF THE DRAWINGS

Preferred embodiments will be best understood from the following specification taken with the attached drawings, in which:

FIG. 2 is a table showing the solubility of tryptophan and lysine after processing according to the invention;

FIG. 3 is a table showing the bulk density of several ratios of tryptophan, lysine, and isoleucine; and FIG. 4 is a table showing tryptophan/lyine runs on a spray granulator.

DETAILED DESCRIPTION OF THE INVENTION

Figure 1:
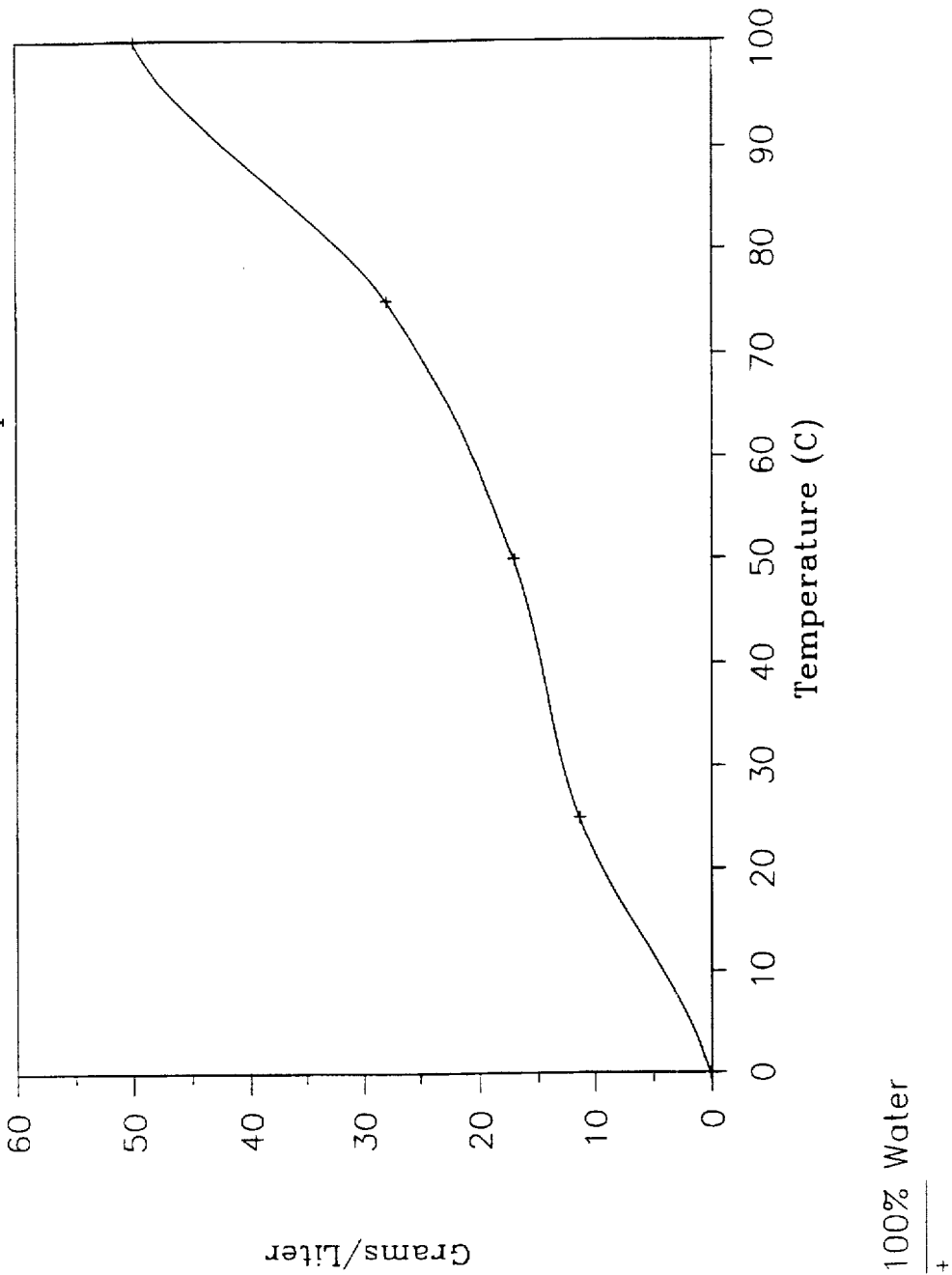
FIG. 1 is a graph showing how the solubility of L-Tryptophan in water varies as a function of temperature.

The low solubility of a relatively insoluble non-polar hydrophobic amino acid, such as tryptophan, increases the cost of drying, packaging and handling of the amino acid. More particularly, during a commercial preparation of pure amino acids, some amino acids are particularly difficult to dry due to their low solubility in water. L-Tryptophan is an example of a particularly useful amino acid, especially for domesticated farm animals, which is particularly difficult to dry.

FIG. 1 shows the solubility curve of tryptophan, taken with respect to variations in temperature. This curve indicates a low solubility which requires the drying of a large amount of water if the product is not to precipitate from the solution and clog the spray nozzles of the drier. For this reason, the economics of drying pure tryptophan are very poor. Also, this low solubility produces a product with a very fine particle size which leads to the dust problems.

Spray drying dilute solutions of tryptophan is undesirable for a number of reasons. First, the fine particle size results in a very low bulk density which increases packaging and transportation costs. It also contributes to dusting and handling problems encountered by the end user of the product.

The inventive process involves starting with two hot, saturated amino acid solutions (one hydrophobic, the other hydrophilic) and mixing them so that the resulting solution mixture stays in solution. The polar, hydrophilic amino acid is selected from a group including asparagine, cystine, glutamine, glycine, serine, threonine, aspartic acid, glutamic acid, arginine, histidine, and lysine. The non-polar, hydrophobic amino acid is selected from the group consisting of alanine, isoleucine, leucine, methionine, phenylalanine, proline, tyrosine, tryptophan, and valine. If these blends are produced in the proper ratios, they can be used to formulate animal feeds with the correct amino acid balance to be useful to animals, especially domesticated farm animals, such as livestock.

For domestic animals, the preferred hydrophilic amino acid is L-Lysine, which may be mixed with the preferred hydrophobic amino acid L-Tryptophan. In this mixture, the hydrophobic amino acid is soluble at a level above its individual solubility limit after the mixed solution is cooled. Hence, there is a greatly improved economy in the production of this and similar mixed solutions as compared to the cost of drying each amino acid separately and dry blending the resultant powdered products. The improved economy of production occurs because there is a reduction in the amount of water which must be evaporated or otherwise dried. The drying of this mixed amino acid solution also produces a dry product with a higher bulk density as compared to the bulk density, especially, of the hydrophobic amino acids if they are each dried separately.

For spray-drying, tryptophan feed solutions usually range from 30 grams per liter to 60 grams per liter of L-Tryptophan depending on the temperature of the drier feed tank. For L-Lysine hydrochloride, the drier feed can be 400 to 500 grams per liter if the feed tank is held at high temperature. Blends of these two amino acids can be kept in solution at dry solids levels which are higher than the individual solubility of the separate hydrophobic amino acid in water. This high level of dry solids enables the improved economy in the drying operation and produces a higher bulk density product.

In making up an aqueous solution of L-tryptophan and L-lysine hydrochloride, preferably the L-tryptophan is 5% to 30% by weight of the L-lysine hydrochloride, and more preferably 10% to 20% by weight, and still more preferably, 10% to 15% by weight. There is a trade off between the physical form (higher bulk density, reduced number of fines—less dust) and cost of production. Of these trade off parameters, the preferred criterion for a domestic farm animal feed supplement is to maximize the amount of tryptophan and the high bulk density in the final product.

EXAMPLE 1

A series of solutions were made by dissolving pure lysine and pure tryptophan, both of which were manufactured by the Archer Daniels Midland Company of Decatur, Ill. Each solution was prepared by adding a given weight of amino acids to 50 milliliters of water in a 250 milliliter Erlenmeyer flask. The solutions were stirred with a magnetic stir bar while being heated on a hot plate. The temperature was recorded with a digital thermometer using a $1/16$ inch diameter probe. As the solutions were heated, they were visually monitored to determine the temperature where the solutions became non-turbid. Table 1 (FIG. 1) summarizes the solubility information. From Table 1 it can be seen that the mixtures of tryptophan and lysine are still soluble at high dry solids levels, the solubility of the mixtures being considerably above the solubility of tryptophan, per se. The mixtures of the amino acid solutions are dried by spray granulation or by spray drying, with resulting densities as shown in Table 2 (FIG. 3).

EXAMPLE 2

Various solutions containing tryptophan, lysine, or isoleucine in the proportions given in Table 2 (FIG. 3) were spray dried by using a Niro laboratory spray drier with an air driven rotary atomizer. For all samples, an inlet temperature of 275° C. was used with an outlet temperature ranging from 110° C. to 120° C. The bulk density of the dry powder samples were measured by putting a quantity of the powder in a tared 100 ml graduated cylinder. The cylinder was tapped seven times, the level of the powder was read, and the gross weight of the cylinder was measured.

The weight of the powder was divided by the volume in order to calculate the bulk density. Table 2 shows the bulk density (column "BD") for mixtures in various ratios of tryptophan, lysine, and isoleucine. It can be seen from Table 2 that the bulk density ("BD") of the hydrophobic amino acid (here the tryptophan or isoleucine) in the spray dried mixture was higher than its bulk density taken alone and not in the mixture. In particular, the bulk density of the tryptophan in all the mixtures was nearly twice the bulk density of the tryptophan, alone.

EXAMPLE 3

Plant trials were run with a commercial spray granulator using feed grade lysine and tryptophan. A spray granulator dries the particles by spraying a liquid on to a heated fluidized bed so that the particles become a granule sized aggregate. The results of these trials over a period of several days are included in the following Table 3 (FIG. 4)

Those who are skilled in the art will readily perceive how to modify the invention. Therefore, the appended claims are to be construed to cover all equivalent structures which fall within the true scope and spirit of the invention.

The claimed invention is:

1. A process for increasing the bulk density and improving the solubility of amino acids in water comprising:
    preparing hot saturated aqueous solutions comprising at least two different amino acids, one of said acids being a polar hydrophilic acid selected from the group consisting of asparagine, cystine, glutamine, glycine, serine, threonine, aspartic acid, glutamic acid, arginine, histidine and lysine and another of said acids being a non-polar hydrophobic acid selected from the group consisting of alanine, isoleucine, leucine, methionine, phenylalanine, proline, tyrosine, tryptophan and valine;
    mixing the hot saturated aqueous solutions comprising the amino acids to prepare a hot solution mixture of said at least two amino acids; and
    drying said mixture.

2. A process for increasing the bulk density and improving the solubility of amino acids in water comprising:
    preparing hot saturated aqueous solutions comprising at least two different amino acids, one of said acids being a polar hydrophilic acid and another of said acids being a non-polar hydrophobic acid, wherein said two different amino acids are L-Tryptophan and L-Lysine;
    mixing the hot saturated aqueous solutions comprising the amino acids to prepare a hot solution mixture of said at least two amino acids; and
    drying said mixture.

3. The process of claim 2 wherein the ratio of L-Tryptophan to L-Lysine is 1 part tryptophan and 20 parts lysine.

4. The process of claim 2 wherein the ratio of L-Tryptophan to L-Lysine is 1 part tryptophan and 10 parts lysine.

5. The process of claim 2 wherein the ratio of L-Tryptophan to L-Lysine is 1 part tryptophan and 4 parts lysine.

6. The process of claim 2 in which the hot saturated aqueous solutions of amino acids are at least about 220° F.

7. The process of claim 2 in which the hot saturated aqueous solution of tryptophan contains at least about 50 grams of tryptophan per liter of water, and the hot saturated aqueous solution of lysine contains at least about 300 grams per liter of water.

8. A process for increasing the bulk density and improving the solubility of amino acids in water comprising:
    preparing hot saturated aqueous solutions comprising at least two different amino acids, one of said acids being a polar hydrophilic acid and another of said acids being a non-polar hydrophobic acid, wherein said two amino acids are isoleucine and lysine;
    mixing the hot saturated aqueous solutions comprising the amino acids to prepare a hot solution mixture of said at least two amino acids; and
    drying said mixture.

9. The process of claim 1 in which said two amino acids are methionine and lysine.

10. The process of claim 1 in which two amino acids are methionine and threonine.

11. A process for preparing amino acids in a dry, high density powdered form from aqueous solutions of amino acids, at least one of which has a low solubility in water, said process comprising the steps of:
    preparing a hot saturated aqueous solution of a first amino acid, said first amino acid being a hydrophobic amino acid selected from the group consisting of alanine, isoleucine, leucine, methionine, phenylalanine, proline, tyrosine, tryptophan and valine having a low solubility in water;
    preparing a hot saturated aqueous solution of a second amino acid, said second amino acid being a hydrophilic amino acid selected from the group consisting of asparagine, cystine, glutamine, glycine, serine, threonine, aspartic acid, glutamic acid, arginine, histidine and lysine.
    mixing the two hot saturated aqueous solutions to prepare a hot solution mixture; and
    drying the hot solution mixture.

12. A process for preparing amino acids in a dry, high density powdered form from aqueous solutions of amino acids, at least one of which has a low solubility in water, said process comprising the steps of:
    preparing a hot saturated aqueous solution of a first amino acid, said first amino acid being a hydrophobic acid having a low solubility in water;
    preparing a hot saturated aqueous solution of a second amino acid, said second amino acid being a hydrophilic amino acid;
    wherein the first amino acid is tryptophan and the second amino acid is lysine;
    mixing the two hot saturated aqueous solutions to prepare a hot solution mixture; and
    drying the hot solution mixture.

13. The process of claim 12 in which the concentration of tryptophan in the hot aqueous solution is at least about 50 grams per liter of water and the concentration of lysine in the hot aqueous lysine solution is at least about 300 grams per liter of water.

14. The process of claim 11 in which the first amino acid is tryptophan and the second amino acid is threonine.

15. The process of claim 11 in which the first amino acid is methionine and the second amino acid is lysine.

16. The process of claim 11 in which the first amino acid is methionine and the second amino acid is threonine.

17. The process of claim 11 in which the solution mixture is dried by spray granulation.

18. The process of claim 11 in which the solution mixture is spray dried.

19. A process for co-drying a blend of two or more amino acids, one of said amino acids being hydrophobic, and the other of said amino acids being hydrophilic where the amino acids are mixed in solution at a ratio having a dry solids level which is higher than solubility limits for hydrophobic amino acids.

20. A process for co-drying a blend of two or more amino acids, one of said amino acids being hydrophobic and the other of said amino acids being hydrophilic, where the amino acids are mixed in solution at a ratio having a dry solids level which is higher than solubility limits for hydrophobic amino acids;
    wherein the two amino acids being co-dried are lysine and tryptophan.

21. A process for co-drying a blend of two or more amino acids, one of said amino acids being hydrophobic and the other of said amino acids being hydrophilic, where the amino acids are mixed in solution at a ratio having a dry solids level which is higher than solubility limits for hydrophobic amino acids;

wherein the amino acids being co-dried are lysine and tryptophan and the concentration of lysine is greater than 300 grams per liter and the concentration of tryptophan is greater than 50 grams per liter.

* * * * *